United States Patent
Hahn et al.

(10) Patent No.: US 8,180,326 B2
(45) Date of Patent: May 15, 2012

(54) METHOD OF SUPPORTING LOCATION PRIVACY

(75) Inventors: Gene Beck Hahn, Gyeonggi-do (KR); Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 439 days.

(21) Appl. No.: 12/503,681

(22) Filed: Jul. 15, 2009

(65) Prior Publication Data

US 2010/0015951 A1 Jan. 21, 2010

Related U.S. Application Data

(60) Provisional application No. 61/080,694, filed on Jul. 15, 2008, provisional application No. 61/081,018, filed on Jul. 15, 2008, provisional application No. 61/113,230, filed on Nov. 11, 2008, provisional application No. 61/095,624, filed on Sep. 10, 2008.

(30) Foreign Application Priority Data

Dec. 29, 2008 (KR) .................. 10-2008-0135637

(51) Int. Cl.
*H04M 1/66* (2006.01)
*H04M 1/68* (2006.01)
*H04M 3/16* (2006.01)
(52) U.S. Cl. ........................ 455/411; 455/410
(58) Field of Classification Search ........... 455/410–411
See application file for complete search history.

(56) References Cited

U.S. PATENT DOCUMENTS

| 2003/0177267 | A1* | 9/2003 | Orava et al. ............... 709/245 |
| 2005/0003806 | A1 | 1/2005 | Bazin et al. |
| 2005/0050352 | A1* | 3/2005 | Narayanaswami et al. ... 713/201 |
| 2005/0192011 | A1* | 9/2005 | Hong et al. ............... 455/440 |
| 2005/0208940 | A1 | 9/2005 | Takase et al. |
| 2008/0080409 | A1 | 4/2008 | Zhang et al. |

FOREIGN PATENT DOCUMENTS

| KR | 1020000047194 | 7/2000 |
| KR | 1020040028099 | 4/2004 |

OTHER PUBLICATIONS

Michel Barbeau, "WiMax/802.16 Threat Analysis," ACM Workshop on QoS and Security for Wireless and Mobile Networks, Oct. 2005.
M. Saito et al., "Digital Baseband SoC for Mobile WiMax Terminal Equipment," Fujitsu Scientific & Technical Journal, vol. 44, No. 3, pp. 227-238, Jul. 2008.

(Continued)

*Primary Examiner* — Nick Corsaro
*Assistant Examiner* — Munsoon Choo
(74) *Attorney, Agent, or Firm* — Lee, Hong, Degerman, Kang & Waimey

(57) ABSTRACT

A method of protecting location privacy of a mobile station when the mobile station enters a network is disclosed. A method of supporting location privacy comprises the steps of transmitting a ranging code for performing initial ranging; and receiving a message including temporary station identifier after transmitting a ranging request message including MAC address of a mobile station. In this case, the temporary station identifier is used to provide security of a media access control (MAC) address or mapping information of the MAC address and station identifier, wherein the MAC address is to identify a mobile station within a base station.

14 Claims, 6 Drawing Sheets

OTHER PUBLICATIONS

S. Madanapalli et al., "Transmission of IPv4 Packets over IEEE 802.16's IP Convergence Sublayer draft-ietf-16ng-ipv4-over-802-dot-16-ipcs-01.txt," IETF 16ng Working Group Internet-Draft, Nov. 2007.

Xenakis et al., "Security in third Generation Mobile Networks", Communication Networks Laboratory, University of Athens, pp. 641-644, Dec. 2003.

* cited by examiner

METHOD OF SUPPORTING LOCATION PRIVACY

CROSS-REFERENCE TO RELATED APPLICATIONS

This application claims the benefit of the Korean Patent Application No. 10-2008-0135637, filed on Dec. 29, 2008, which is hereby incorporated by reference as if fully set forth herein.

This application also claims the benefit of U.S. Provisional Application Ser. Nos. 61/080,694, filed on Jul. 15, 2008, 61/081,018, filed on Jul. 15, 2008, 61/113,230, filed Nov. 11, 2008, and 61/095,624, filed on Sep. 10, 2008 the contents of which are hereby incorporated by reference herein in their entirety.

BACKGROUND OF THE INVENTION

1. Field of the Invention

The present invention relates to a method of transmitting and receiving data in a wireless access system to ensure privacy and security, and more particularly, to a method of supporting location privacy of a mobile station when the mobile station enters a network.

2. Discussion of the Related Art

Hereinafter, a general encryption scheme will be described in brief.

Encryption means that a transmitter and a receiver intentionally distort data during communication to maintain privacy. A general encryption procedure will be described as follows. The transmitter encrypts plaintext using a specific encryption key to generate a ciphertext. The transmitter transmits the ciphertext to the receiver. The receiver can translate the received ciphertext through decryption. In this way, the transmitter and the receiver can encrypt voice and/or data for privacy of communication between them.

Examples of the encryption scheme include a symmetric key scheme and an asymmetric key scheme.

The symmetric key scheme means that a single key is used for encryption and decryption. A symmetric key algorithm means that the transmitter and the receiver perform encryption and decryption using a single key (shared secret key).

The asymmetric key scheme means that an encryption key, i.e., public key, used for encryption is different from a secret key (or private key) used for decryption and thus the public key is only opened to the public and the secret key is maintained safely. The asymmetric key scheme is based on a public key based structure such as Revest Shamir Adleman (RSA) or a public key encryption mode.

Hereinafter, a general method of performing a network entry procedure from a mobile station to a base station will be described in brief.

The mobile station can acquire synchronization with the base station by scanning a downlink panel of the base station. Also, the mobile station can acquire transmission parameters through an uplink channel descriptor (UCD) message. Accordingly, the mobile station can perform an initial ranging procedure for the base station.

After performing the initial ranging procedure, the mobile station and the base station can perform negotiation of basic capability. The base station can give a right for performing communication to the mobile station by authenticating the mobile station and exchange an encryption key with the mobile station. Thus, the mobile station can perform a registration procedure to the base station.

SUMMARY OF THE INVENTION

In a ranging procedure of the general communication technology, a medium access control (MAC) address that can identify a mobile station and mapping information of the MAC address and station identifier can be used without any protection. Accordingly, in case of a service to be provided by a base station, the MAC address of the mobile station and the mapping information of the MAC address and station identifier may be misused by an ill-intentioned attacker.

For example, location privacy is to provide security of a mobile station including a MAC address of the mobile station and/or station identifier for identifying the mobile station within a base station. In a general wireless access system, station identifier can be allocated after an authentication procedure ends. For instance, if a TEK is set between the mobile station and the base station during the authentication procedure, the station identifier can be encrypted and then transmitted from the base station to the mobile station.

In other words, damage of location privacy means active and passive attack of an attacker against the identifier of the mobile station. This includes various attacks using mobile station identifier, including simple tapping of mobile station identifier (for example, MAC address, MS ID, etc.) exchanged between a network and the mobile station and base station identifier (BS ID).

Accordingly, the present invention is directed to apparatus and method of supporting location privacy, which substantially obviate one or more of the problems due to limitations and disadvantages of the related art.

An object of the present invention is to provide an apparatus and a communication method in which privacy and security are maintained when a mobile station performs a network entry procedure.

Another object of the present invention is to solve a location privacy problem where a MAC address of a mobile station is exposed.

Still another object of the present invention is to provide an apparatus and a method of protecting station ID used to identify a mobile station and/or mapping information of MAC address and station identifier in a base station. Namely, the present invention is to provide a method of supporting location privacy to prevent location information of a user (for example, mobile station) from being exposed by an ill-intentioned attacker.

Further still another object of the present invention is to prevent a MAC address of a mobile station and mapping information of the MAC address and station identifier from being exposed by using separate identifier that can temporarily be used until the mobile station safely obtains station identifier after an authentication procedure ends when the mobile station performs an initial ranging procedure for network entry.

To achieve these and other advantages and in accordance with the purpose of the present invention, as embodied and broadly described, the present invention discloses various methods of protecting location privacy of a mobile station when the mobile station enters a network.

In one aspect of the present invention, a method of supporting location privacy comprises the steps of transmitting a ranging code for performing initial ranging; and receiving a ranging response message in response to the ranging request message; and transmitting a raging request message, then receiving a message (for example, ranging response (RNG- RSP) message and/or MAP message) including temporary station identifier (T-STID). In this case, the temporary station identifier is used to provide security of a media access control (MAC) address or mapping information of the MAC address and station identifier, wherein the MAC address is to identify a mobile station within a base station. That is, the MAC address of the mobile station is not exchanged through an air interface differently from an IEEE 802.16e system.

According to one aspect of the present invention, the temporary station identifier is used until an authentication procedure between the mobile station and the base station is completed. Also, the temporary station identifier is used until encryption keys are set and permanent station identifier is safely allocated after an authentication procedure is completed. Namely, temporary station identifier is released after the base station allocates station identifier to the mobile station.

According to one aspect of the present invention, before performing the above steps, the method further comprises the step of negotiating a support level of location privacy between the mobile station and the base station.

Also, according to one aspect of the present invention, the method further comprises the step of receiving a map message for allocating a radio resource from the base station, wherein the map message is transmitted using the temporary station identifier.

Also, after an encryption key is set during authentication procedure, the method further comprises a step of transmitting a message (e.g. REG-REQ) comprising the MAC address encrypted with the encryption key by the mobile station.

Also, after an encryption key is set during authentication procedure, the method further comprises a step of transmitting a message (e.g. REG-RSP) comprising a station identifier encrypted with the encryption key by the base station.

In another aspect of the present invention, a method of supporting location privacy comprises the steps of transmitting a ranging code for performing initial ranging; receiving a ranging response message in response to the ranging request message; transmitting a ranging request message again and then receiving a first message (for example, RNG-RSP message, etc.) including temporary identifier after transmitting a ranging request message. In this case, the temporary identifier is used to provide security of a media access control (MAC) address. Also, the temporary identifier is used until an authentication procedure between the mobile station and the base station is completed.

Otherwise, the temporary station identifier can be used until the encryption keys are set after authentication procedure and a permanent station identifier is allocated safely. In other words, the temporary station identifier is released when the station identifier is allocated from the base station to the mobile station.

Also, after an encryption key is set during authentication procedure, the another aspect of the present invention further comprises a step of transmitting a message (e.g. REG-REQ) comprising the MAC address encrypted with the encryption key by the mobile station.

Also, after an encryption key is set during authentication procedure, the another aspect of the present invention further comprises a step of transmitting a message (e.g. REG-RSP) comprising a station identifier encrypted with the encryption key by the base station.

According to another aspect of the present invention, the first message further includes temporary station identifier. In this case, the temporary station identifier is used to provide security of a MAC address or mapping information of the MAC address and station identifier, wherein the MAC address is to identify a mobile station within a base station.

Furthermore, according to another aspect of the present invention, the method further comprises the steps of receiving a map message for allocating a radio resource, from the base station; and transmitting a ranging request message to the base station, the ranging request message including the temporary identifier. In this case, the map message is transmitted using the temporary station identifier.

According to another aspect of the present invention, the temporary identifier and the temporary station identifier are used until an authentication procedure between the mobile station and the base station is completed. Alternatively, the temporary station identifier is used until encryption keys are set and permanent station identifier is safely allocated after an authentication procedure between the mobile station and the base station is completed. Preferably, temporary station identifier is released after the base station allocates station identifier to the mobile station. That is, the temporary station identifier is released when the permanent station identifier is allocated to the mobile station.

In still another aspect of the present invention, a method of supporting location privacy comprises the steps of receiving a ranging code for performing initial ranging in a base station; and transmitting a message (for example, RNG-RSP and/or MAP message) including temporary station identifier from the base station after receiving a ranging request message including a MAC address of a mobile station. In this case, the temporary station identifier is used to provide security of MAC address or mapping information of the MAC address and station identifier, wherein the MAC address is to identify the mobile station within the base station.

According to still another aspect of the present invention, the temporary station identifier is used until an authentication procedure between the mobile station and the base station is completed. Also, the temporary station identifier is used until encryption keys are set and permanent station identifier is safely allocated after an authentication procedure is completed. Namely, the temporary station identifier is released after the base station allocates permanent station identifier to the mobile station.

According to still another aspect of the present invention, the method further comprises the step of transmitting a map message for allocating a radio resource to the mobile station. In this case, the map message is transmitted using the temporary station identifier.

In further still another aspect of the present invention, a method of supporting location privacy comprises the steps of receiving a ranging code for performing initial ranging; and transmitting a first message including temporary identifier after receiving a ranging request message. In this case, the temporary identifier is used to provide security of a media access control (MAC) address.

According to further still another aspect of the present invention, the method further comprises the step of receiving a second message (for example, ranging request (RNG-REQ) message) including privacy level information to negotiate a location privacy level that can additionally be supported. In this case, the second message is transmitted using the temporary identifier. The first message further includes temporary station identifier. In this case, the temporary station identifier is used to provide security of MAC address and mapping information of the MAC address and station identifier, wherein the MAC address is to identify the mobile station within the base station.

According to further still another aspect of the present invention, the method further comprises the steps of transmitting a map message for allocating a radio resource, to the mobile station; and receiving a ranging request message from the mobile station, the ranging request message including the temporary identifier. In this case, the map message is transmitted using the temporary station identifier, and the temporary station identifier is used until an authentication procedure between the mobile station and the base station is completed. Also, the temporary station identifier is used until encryption keys are set and permanent station identifier is safely allocated after an authentication procedure is completed. Namely, the temporary station identifier is released after the base station allocates permanent station identifier to the mobile station.

According to the embodiments of the present invention, the following effects and/or advantages can be obtained.

First of all, it is possible to maintain privacy and security of the mobile station when the mobile station performs a network entry procedure.

Second, it is possible to solve the location privacy problem where the MAC address of the mobile station is exposed. Namely, it is possible to prevent location information of the mobile station from being exposed by an ill-intentioned attacker.

Third, when the mobile station performs an initial ranging procedure, separate identifier that can temporarily be used is used until the mobile station safely obtains station identifier after an authentication procedure ends, whereby the MAC address of the mobile station and mapping information of the MAC address and station identifier can be prevented from being exposed.

Finally, since the mobile station and the base station previously negotiate a support level of location privacy and mobile station identifier is not transmitted directly through a wireless interface, it is possible to prevent the mobile station identifier from being exposed by ill-intentioned attackers until the authentication procedure is completed.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
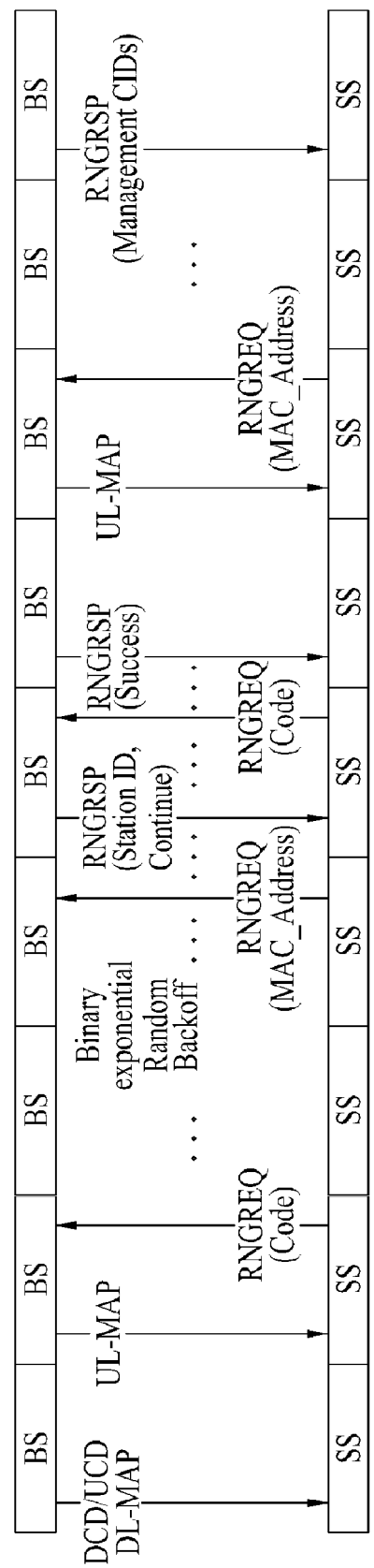
FIG. 1 is a diagram illustrating an initial ranging procedure.

Hereinafter, preferred embodiments of the present invention will be described in detail with reference to the annexed drawings. The detailed description, which will be given below with reference to the accompanying drawings, is intended to explain exemplary embodiments of the present invention, rather than to show the only embodiments that can be implemented according to the invention.

The following description provides specific details for a thorough understanding of embodiments of the invention. However, one skilled in the art will understand that the invention may be practiced without these details. In other instances, well-known structures and functions have not been described in detail or may be shown in block diagram form to avoid unnecessarily obscuring the description of embodiments of the invention. Wherever possible, the same reference numbers will be used throughout the drawings to refer to the same or like parts.

The present invention relates a wireless access system. The present invention discloses various methods for protecting location privacy of a mobile station when the mobile station enters a network.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will be omitted, and procedures or steps equivalent to the range that can be understood by those skilled in the art will be omitted.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), advanced base station (ABS) and access point. Also, the mobile station may be replaced with terms such as a user equipment (UE), a subscriber station (SS), a mobile subscriber station (MSS), advanced mobile station (AMS) and a mobile terminal.

Furthermore, a transmitter means a node that transmits data service or voice service, and a receiver means a node that receives data service or voice service. Accordingly, in an uplink, the mobile station could be a transmitter, and the base station could be a receiver. Likewise, in a downlink, the mobile station could be a receiver, and the base station could be a transmitter.

Meanwhile, in the present invention, examples of the mobile station include a personal digital assistant (PDA), a cellular phone, a personal communication service (PCS)

phone, a global system for mobile (GSM) phone, a wideband CDMA (WCDMA) phone, and a mobile broadband system (MBS) phone.

The embodiments according to the present invention can be implemented by various means, for example, hardware, firmware, software, or their combination.

If the embodiment according to the present invention is implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify technical spirits of the present invention can be supported by the above standard documents.

Also, all terminologies disclosed herein can be described by the above standard documents. Particularly, the embodiments of the present invention can be supported by one or more of standard documents of the IEEE 802.16 system, i.e., P802.16-2004, P802.16e-2005 and P802.16Rev2.

Specific terminologies hereinafter described are provided to assist understanding of the present invention, and various modifications can be made in the specific terminologies within the range that they do not depart from technical spirits of the present invention.

FIG. 1 is a diagram illustrating an initial ranging procedure.

Referring to FIG. 1, a base station (BS) transmits a downlink map (DL-MAP) message to a mobile station (MS). Also, the base station may transmit a downlink channel descriptor (DCD) and/or an uplink channel descriptor (UCD) to the mobile station. If the downlink map message is received, the mobile station can acquire synchronization with the base station in a medium access control (MAC) layer. The mobile station can maintain synchronization with the base station as far as the mobile station receives the downlink map message and the DCD message.

The base station can transmit a UCD message to the mobile station after performing synchronization with the mobile station, wherein the UCD message includes a set of transmission parameters for supporting an uplink channel that can be used by the mobile station. The base station can periodically transmit the UCD message to the mobile station to support all available uplink channels. Also, the base station can notify information of the uplink channels by transmitting an uplink map (UL-MAP) message to the mobile station.

The mobile station can perform an initial ranging procedure with the base station after receiving the UCD message and/or the UL-MAP message from the base station. The initial ranging procedure can be performed through exchange of a ranging request (RNG-REQ) message and a ranging response (RNG-RSP) message.

Accordingly, the mobile station transmits a ranging code to the base station to request ranging (RNG-REQ). If ranging request is failed, the mobile station can again perform initial ranging after a certain time passes. Also, the mobile station can transmit the ranging request message, which includes its MAC address, to the base station.

The base station transmits a station identifier (station ID) to the mobile station in response to the ranging request message, wherein the station ID is used to identify a specific mobile station within the base station.

If the initial ranging procedure is successfully performed, the mobile station transmits the ranging request message, which includes its MAC address, to the base station, and the base station transmits a ranging response message, which includes management connection identifier (MCID), to the mobile station.

Figure 2:
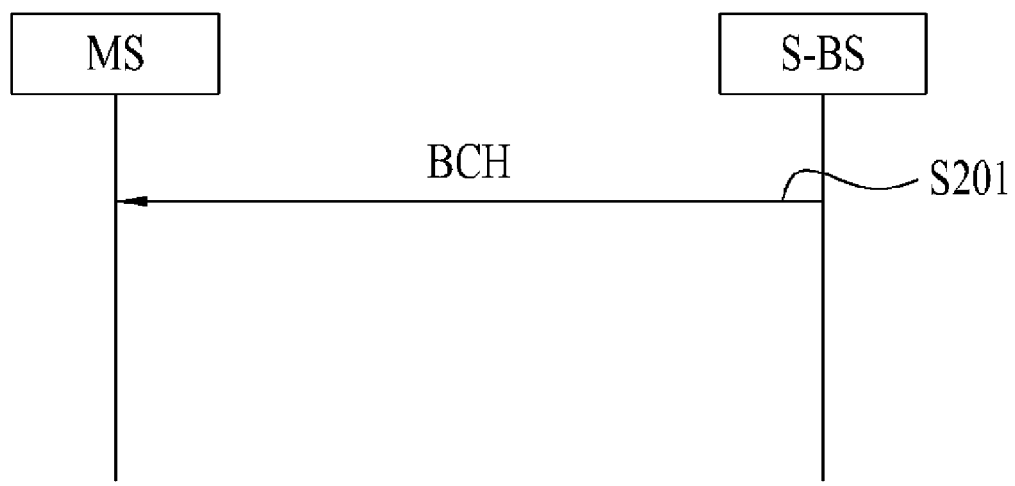
FIG. 2 is a diagram illustrating a procedure of negotiating location privacy in accordance with one embodiment of the present invention.

FIG. 2 is a diagram illustrating a procedure of negotiating location privacy in accordance with one embodiment of the present invention.

Referring to FIG. 2, the mobile station can negotiate a level for supporting location privacy with a serving base station (S-BS). Namely, the base station can negotiate location privacy with the mobile station through a periodic broadcast channel (BCH).

The BCH can include privacy level information indicating whether the base station protects only the mobile station identifier (or MAC address), whether the base station protects MAC address identifying the mobile station and mapping information of the MAC address and station ID, whether the base station protects only paging ID, or whether the base station protects several kinds of combination of the station ID, the MAC address, the mapping information, and paging ID.

In the embodiments of the present invention the MAC address of the mobile station is protected using a temporary identifier (Temp ID), and the station ID is protected using temporary station ID. At this time, the temporary ID and the temporary station ID can be used until the authentication procedure is completed.

Namely, the temporary ID and the temporary station ID can be used until encryption keys are set and permanent station identifier is safely allocated after the authentication procedure is completed. If the base station allocates permanent station ID to the mobile station, the temporary station ID is released.

Figure 3:
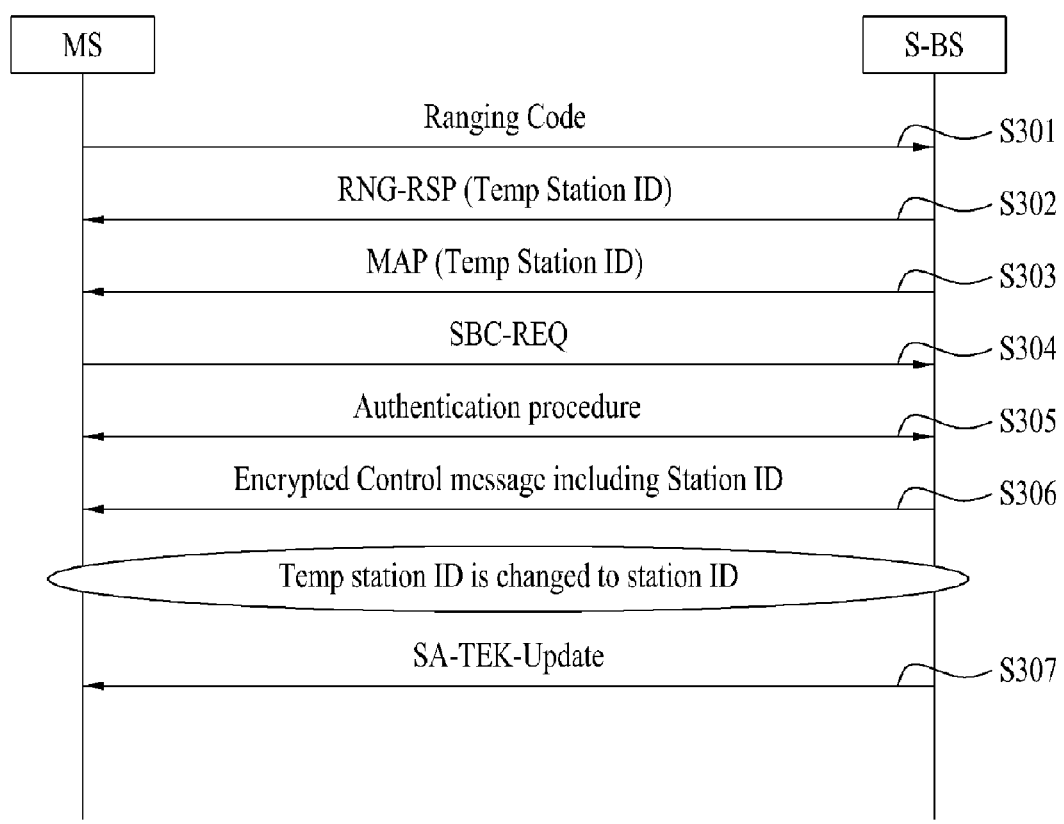
FIG. 3 is a diagram illustrating a method of supporting location privacy using a temporary station identifier in accordance with one embodiment of the present invention.

FIG. 3 is a diagram illustrating a method of supporting location privacy using a temporary station identifier in accordance with one embodiment of the present invention.

Preferably, the method disclosed in FIG. 3 is performed after the procedure indicating a support level of location privacy of FIG. 2 is performed. For initial network entry, the mobile station (MS) transmits a ranging code to the base station (S301).

In step S301, the base station transmits a ranging response message in response to the raging code, then the base station receives ranging request message again. That is, the mobile station does not transmit the MAC address of the mobile station through an air interface differently from an IEEE 802.16e system.

The serving base station (S-BS) can transmit a ranging response message to the mobile station, wherein the ranging response message includes temporary station ID. Namely, the serving base station can allocate temporary station ID instead of station ID to the mobile station so as to protect location privacy (MAC address of the mobile station and/or mapping information between MAC address and station ID) of the mobile station (S302).

The serving base station can transmit a map message, which includes a temporary station identifier (Temp station ID), to the mobile station. Namely, the serving base station can allocate a radio resource to the mobile station using the temporary station ID so as to protect location privacy (MAC address of the mobile station and/or mapping information between MAC address and station ID) of the mobile station (S303).

The mobile station and the base station can perform a basic capability negotiation procedure using temporary station ID. For example, the mobile station and the base station can perform the basic capability negotiation procedure in such a manner that the mobile station transmits a subscriber station basic capability request (SBC-REQ) message to the serving base station (S304), and the serving base station transmits a subscriber station basic capability response (SBC-RSP) message to the mobile station (not shown).

Temporary station ID can be used in the base station and the mobile station until the authentication procedure is completed. Also, MAC address of the mobile station can be encrypted after the authentication procedure is completed (S305). Furthermore, the temporary station ID can be used until encryption keys (for example, TEK) are set and permanent station ID is safely allocated after the authentication procedure is completed. Namely, the temporary station ID is released when the permanent station ID is allocated from the base station to the mobile station.

If the serving base station successfully performs authentication with the mobile station, the serving base station may encrypt a control message (for example, registration response (REG-RSP) message), which includes encrypted station ID, and then transmit the control message to the mobile station (S306).

Otherwise, the serving base station may encrypt station ID, and transmit the control message (for example, registration response (REG-RSP) message), which includes the encrypted station ID, to the mobile station.

In other words, after the authentication procedure is successfully performed, since encryption keys for supporting location privacy are set in the mobile station and the base station, the mobile station and the base station can exchange station ID and MAC address protected with a traffic encrypted key (TEK) without using temporary station ID any more. (S307).

Figure 4:
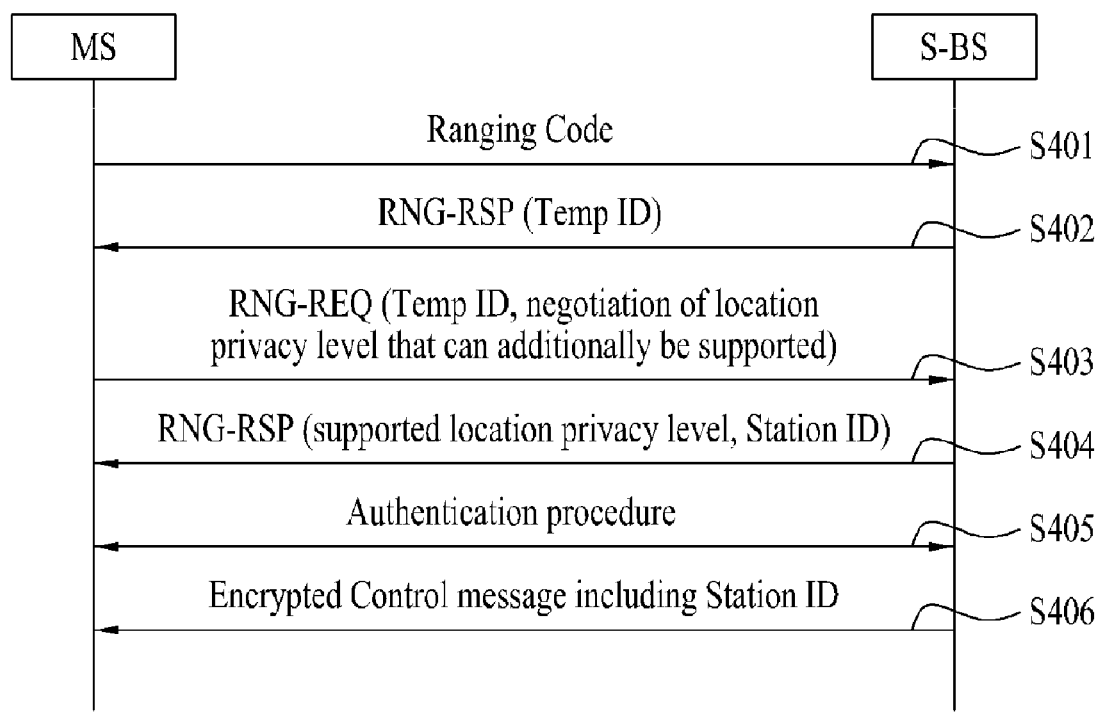
FIG. 4 is a diagram illustrating a method of supporting location privacy using a temporary identifier in accordance with another embodiment of the present invention.

FIG. 4 is a diagram illustrating a method of supporting location privacy using a temporary identifier in accordance with another embodiment of the present invention.

The serving base station can basically support location privacy to protect MAC address of the mobile station when providing a service to the mobile station. In this case, the base station can protect location privacy using temporary identifier (Temp ID) instead of the MAC address of the mobile station during an initial ranging procedure.

Referring to FIG. 4, the mobile station (MS) transmits a ranging code to the serving base station (S-BS) as a ranging request message so as to perform initial ranging (S401).

In step S401, The mobile station can transmit a ranging request message to the base station for requesting uplink resource after receiving a ranging response message in respond to the ranging code.

The serving base station (S-BS) can transmit a ranging response message to the mobile station, wherein the ranging response message includes temporary ID that can be used instead of MAC address of the mobile station (S402).

If the mobile station receives the ranging response message, which includes temporary ID, from the serving base station, the mobile station can recognize that the serving base station basically supports location privacy of the mobile station. However, the mobile station can transmit the ranging request message to the serving base station to negotiate whether the serving base station can additionally protect station ID or paging ID (S403).

In step S403, the mobile station can transmit the ranging request (RNG-REQ) message to the base station, wherein the ranging request message includes temporary ID (instead of MAC address of the mobile station) and privacy level information for negotiating a location privacy level that can additionally be supported.

The serving base station can transmit a ranging response (RNG-RSP) message, which includes location privacy level information supported by itself, to the mobile station. At this time, the ranging response message can indicate that the serving base station additionally protects station ID (S404).

If initial ranging is successfully performed, the serving base station and the mobile station can perform the authentication procedure. The mobile station and the base station can transmit and receive messages to and from each other using temporary ID and temporary station ID even during the authentication procedure until encryption keys are set (S405).

Namely, temporary ID and temporary station ID can be used until encryption keys (for example, TEK) are set and permanent station ID is safely allocated after the authentication procedure is completed. That is, if authentication procedure is performed and the TEK is set, the mobile station can encrypt a message (e.g. REG-REQ) which includes the MAC address with the TEK and transmit the encrypted message to the base station.

The base station may encrypt the control message (e.g. REG-RSP) which includes the station identifier with the TEK and then transmit the encrypted control message to the mobile station (S406).

In step S406, otherwise, the serving base station can transmit a control message (for example, registration response (REG-RSP) message), which includes encrypted station ID, to the mobile station.

The temporary station ID is released when the permanent station ID is allocated from the base station to the mobile station.

Figure 5:
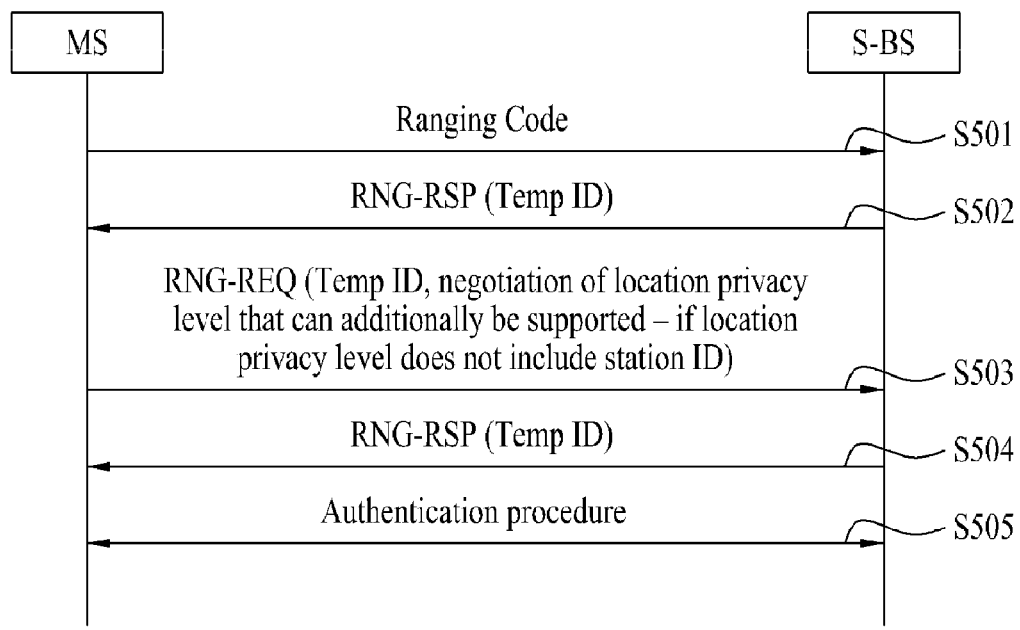
FIG. 5 is a diagram illustrating a method of supporting location privacy using a temporary identifier in accordance with still another embodiment of the present invention.

FIG. 5 is a diagram illustrating a method of supporting location privacy using a temporary identifier in accordance with still another embodiment of the present invention.

The serving base station can basically support location privacy to protect MAC address of the mobile station when providing a service to the mobile station. In this case, the base station can transmit a ranging response (RNG-RSP) message, which includes temporary identifier (Temp ID) instead of the MAC address of the mobile station, during an initial ranging procedure.

Referring to FIG. 5, the mobile station (MS) transmits a ranging code to the serving base station (S-BS) as a ranging request message so as to perform initial ranging (S501). Also, the mobile station can transmit another ranging request message to the serving base station after receiving a ranging response message in response to the ranging code.

The serving base station can transmit a ranging response message, which includes temporary ID (Temp ID) that can be used instead of the MAC address of the mobile station (or mobile station ID), to the mobile station, so as to support location privacy of the mobile station (S502).

If the mobile station receives the ranging response message, which includes temporary ID, from the serving base station, the mobile station can recognize that the serving base station basically supports location privacy of the mobile station. However, the mobile station can transmit the ranging request message to negotiate whether the serving base station can additionally protect station ID or paging ID (S503).

In step S503, the mobile station can transmit the ranging request (RNG-REQ) message to the base station, wherein the ranging request message includes temporary ID allocated from the serving base station and privacy level information for negotiating a location privacy level that can additionally be supported by the serving base station. At this time, it is assumed that the serving base station does not support location privacy in respect of the station ID.

Accordingly, the serving base station can transmit a ranging response (RNG-RSP) message, which includes temporary ID, to the mobile station (S504).

If initial ranging is successfully performed, the serving base station and the mobile station can perform the authentication procedure. The mobile station and the base station can transmit and receive messages to and from each other using temporary ID even during the authentication procedure until encryption keys (for example, TEK) are set (S505).

That is, the temporary identifier can be used until the authentication procedure is completed and the TEK is set. In this case, the mobile station can encrypt a message (e.g. REG-REQ) which includes the MAC address with the TEK and transmit the encrypted message to the base station.

The base station may encrypt the control message (e.g. REG-RSP) which includes the station identifier with the TEK and then transmit the encrypted control message to the mobile station.

Otherwise, the serving base station can transmit a control message (for example, registration response (REG-RSP) message), which includes encrypted station ID, to the mobile station.

After the authentication procedure is completed, the base station can allocate a radio resource to the mobile station using station ID, and the mobile station can be allocated with the radio resource using station ID.

Figure 6:
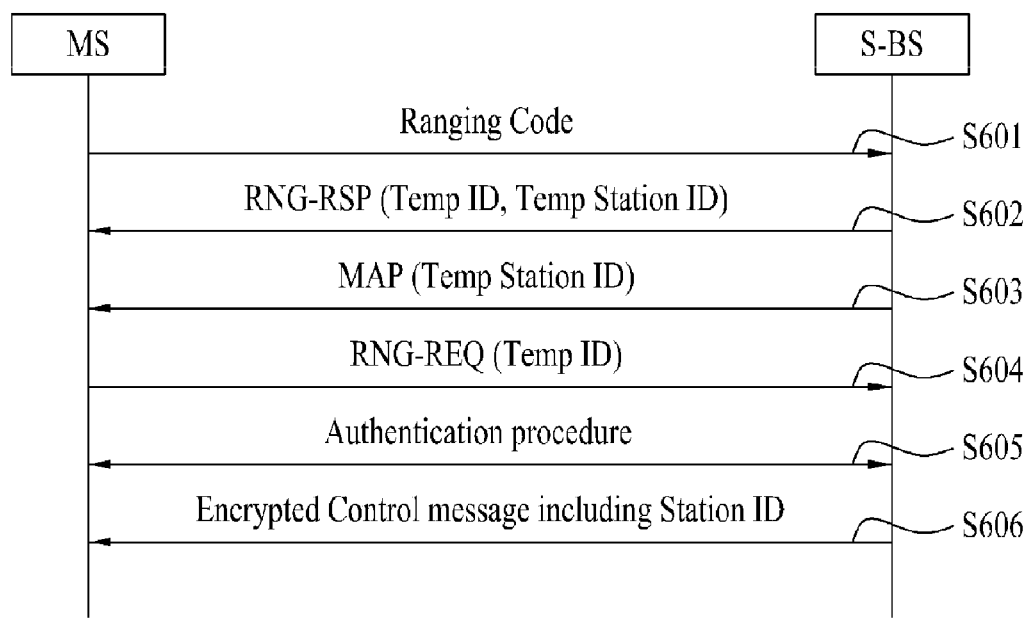
FIG. 6 is a diagram illustrating a method of supporting location privacy using a temporary identifier and a temporary station identifier in accordance with further still another embodiment of the present invention.

FIG. 6 is a diagram illustrating a method of supporting location privacy using a temporary identifier and a temporary station identifier in accordance with further still another embodiment of the present invention.

Referring to FIG. 6, the mobile station (MS) transmits a ranging code to the serving base station so as to perform initial ranging (S601).

In the step S601, the mobile station can also transmit a ranging request message to the serving base station after receiving a ranging response message.

The serving base station can allocate temporary ID (Temp ID) and temporary station ID to the mobile station, wherein the temporary ID is to protect MAC address (or MS ID) of the mobile station, and the temporary station ID is to protect the mobile station within a base station. Accordingly, the serving base station can transmit a ranging response message, which includes at least one of temporary ID and temporary station ID, to the mobile station (S602).

The serving base station can allocate a radio resource to the mobile station using temporary station ID instead of station ID. Accordingly, the serving base station can transmit a map message, which includes temporary station ID, to the mobile station (S603).

In the embodiment of the present invention, the temporary ID and the temporary station ID can be used until encryption keys are generated after the authentication procedure is completed. Namely, the temporary ID and the temporary station ID can be used to provide privacy and security of mobile station identifier (MS ID and/or MAC address) transferred between the mobile station and the base station before the authentication procedure is performed.

For example, the temporary ID and temporary station ID can be used until encryption keys are set and permanent station is safely allocated after the authentication procedure is completed. If the base station allocates permanent station ID to the mobile station, the temporary station ID is released.

The mobile station can transmit a ranging request message, which includes the temporary ID allocated from the base station, to the base station (S604).

In the embodiments of the present invention, if both temporary station ID and temporary ID are supported, the temporary ID can be functioned in same manner as the MAC address of the mobile station.

If initial ranging is successfully performed, the serving base station and the mobile station can perform the authentication procedure. The mobile station and the base station can transmit and receive messages to and from each other using temporary station ID and/or temporary ID even during the authentication procedure until encryption keys are set. If the TEK is set after the authentication procedure, the mobile station can transmit a message comprising the MAC address (e.g. REG-REQ) using the TEK (S605).

After the authentication procedure is successfully performed, the serving base station can transmit a control message (for example, registration response (REG-RSP) message), which includes encrypted station ID, to the mobile station (S606).

In addition, the serving base station may encrypt the control message (for example, registration response (REG-RSP) message), which includes station ID, and then transmit the encrypted control message to the mobile station.

In the embodiments of the present invention, the encrypted MAC address can be exchanged between the mobile station and the serving base station after the authentication procedure is performed. Afterwards, the serving base station can allocate a radio resource to the mobile station using station ID.

As another embodiment of the present invention, the mobile station and the base station through which the embodiments of the present invention can be performed will be described with reference to FIG. 3 to FIG. 6.

The mobile station can be operated as a transmitter in the uplink, and can be operated as a receiver in the downlink. Also, the base station can be operated as a receiver in the uplink, and can be operated as a transmitter in the downlink. Namely, the mobile station and the base station can include a transmitter and a receiver to transmit information or data.

The transmitter and the receiver can include processor, module, part, and/or means for performing the embodiments of the present invention. Particularly, the transmitter and the receiver can include a module (means) for encoding a message, a module for decoding the encoded message, and an antenna for transmitting and receiving the message.

The mobile station used in the embodiments of the present invention can include a low power radio frequency (RF)/intermediate frequency (IF) module. Also, the mobile station can include a means, module or part for performing controller function, medium access control (MAC) frame variable control function according to service characteristics and radio wave condition, handover function, authentication and encryption function, packet modulation and demodulation function for data transmission, quick packet channel coding function, and real-time modem control function, thereby performing the aforementioned embodiments of the present invention.

The base station can transmit data received from an upper layer to the mobile station by wireless or wire. The base station can include a low power RF/IF module. Also, the base station can include a means, module or part for performing controller function, orthogonal frequency division multiple access (OFDMA) packet scheduling, time division duplex (TDD) packet scheduling and channel multiplexing function, medium access control (MAC) frame variable control function according to service characteristics and radio wave condition, handover function, authentication and encryption function, packet modulation and demodulation function for data transmission, quick packet channel coding function, and real-time modem control function, thereby performing the aforementioned embodiments of the present invention.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The embodiments of the present invention can be applied to various wireless access systems. Examples of various wireless access systems include 3GPP(3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

What is claimed is:

1. A method of supporting location privacy, the method comprising:
   transmitting, by a mobile station to a base station, a ranging code for performing an initial ranging procedure; and
   receiving, by the mobile station from the base station, a ranging response (RNG-RSP) message including a temporary station identifier (TSTID) during the initial ranging procedure,
   wherein the TSTID is temporarily used to provide security of mapping between a station identifier (STID) and a media access control (MAC) address of the mobile station until an authorization procedure between the mobile station and the base station is completed and the STID is assigned, and the MAC address identifies the mobile station.

2. The method of claim 1, wherein the TSTID is used until the STID is allocated to the mobile station.

3. The method of claim 1, further comprising:
   negotiating basic capabilities with the base station using the TSTID.

4. The method of claim 1, further comprising:
   receiving a map message for allocating a radio resource from the base station, wherein the map message is transmitted using the TSTID.

5. A method of supporting location privacy, the method comprising:
   receiving, by a base station from a mobile station, a ranging code for performing an initial ranging procedure; and
   transmitting, by the base station to the mobile station, a ranging response (RNG-RSP) message including a temporary station identifier (TSTID) during the initial ranging procedure,
   wherein the TSTID is temporarily used to provide security of mapping between a station identifier (STID) and a media access control (MAC) address of the mobile station until an authorization procedure between the mobile station and the base station is completed and the STID is assigned, and the MAC address identifies the mobile station.

6. The method of claim 5, wherein the TSTID is used until the STID is allocated to the mobile station.

7. The method of claim 5, further comprising:
   negotiating basic capabilities with the mobile station using the TSTID.

8. The method of claim 5, further comprising:
   transmitting a map message for allocating a radio resource to the mobile station, wherein the map message is transmitted using the TSTID.

9. A mobile station for supporting location privacy, the mobile station comprising:
   a transmission module transmitting a radio signal;
   a reception module receiving a radio signal; and
   a processor supporting the location privacy and configured to:
      transmit, to a base station, a ranging code for performing an initial ranging procedure via the transmission module; and
      receive, from the base station, a ranging response (RNG-RSP) message including a temporary station identifier (TSTID) during the initial ranging procedure via the reception module,
   wherein the TSTID is temporarily used to provide security of mapping between a station identifier (STID) and a media access control (MAC) address of the mobile station until an authorization procedure between the mobile station and the base station is completed and the STID is assigned, and the MAC address identifies the mobile station.

10. The mobile station of claim 9, wherein the TSTID is used until the STID is allocated to the mobile station.

11. The mobile station of claim 9, wherein the processor is further configured to negotiate basic capabilities with the base station using the TSTID.

12. A base station for supporting location privacy, the base station comprising:
   a transmission module transmitting a radio signal;
   a reception module receiving a radio signal; and
   a processor supporting the location privacy and configured to:
      receive, from a mobile station, a ranging code for performing an initial ranging procedure via the reception module; and
      transmit, to the mobile station, a ranging response (RNG-RSP) message including a temporary station identifier (TSTID) during the initial ranging procedure via the transmission module,
   wherein the TSTID is temporarily used to provide security of mapping between a station identifier (STID) and a media access control (MAC) address of the mobile station until an authorization procedure between the mobile station and the base station is completed and the STID is assigned, and the MAC address identifies the mobile station.

13. The base station of claim 12, wherein the TSTID is used until the STID is allocated to the mobile station.

14. The base station of claim 12, wherein the processor is further configured to negotiate basic capabilities with the mobile station using the STID.

* * * * *